United States Patent
Zhong et al.

(10) Patent No.: US 11,878,372 B2
(45) Date of Patent: Jan. 23, 2024

(54) SELF-DRIVEN WATER COLLECTING SURFACE WITH SUPERHYDROPHOBIC-SUPERHYDROPHILIC STRUCTURE AND METHOD FOR PREPARING THE SAME

(71) Applicant: TSINGHUA UNIVERSITY, Beijing (CN)

(72) Inventors: Min-Lin Zhong, Beijing (CN); Hong-Jun Zhang, Beijing (CN); Wei-Jian Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 477 days.

(21) Appl. No.: 17/052,524

(22) PCT Filed: Nov. 14, 2018

(86) PCT No.: PCT/CN2018/115468
§ 371 (c)(1),
(2) Date: Nov. 2, 2020

(87) PCT Pub. No.: WO2020/000868
PCT Pub. Date: Jan. 2, 2020

(65) Prior Publication Data
US 2021/0237203 A1 Aug. 5, 2021

(30) Foreign Application Priority Data

Jun. 28, 2018 (CN) .......................... 201810687964.6

(51) Int. Cl.
*B23K 26/361* (2014.01)
*B23K 26/352* (2014.01)
(Continued)

(52) U.S. Cl.
CPC .............. *B23K 26/361* (2015.10); *B05D 5/08* (2013.01); *B23K 26/352* (2015.10);
(Continued)

(58) Field of Classification Search
CPC .................................................... B23K 26/361
See application file for complete search history.

(56) References Cited

U.S. PATENT DOCUMENTS 4,474,228 A * 10/1984 Rogalski ................. F28D 1/022
165/44
6,574,980 B1 * 6/2003 Morrison .................. F28D 5/02
62/304

(Continued)

FOREIGN PATENT DOCUMENTS

| CN | 1872533 | 12/2006 |
| CN | 102797279 | * 11/2012 |

(Continued)

OTHER PUBLICATIONS

IPER, 2018.*

(Continued)

*Primary Examiner* — Henry T Crenshaw (57) ABSTRACT

The present disclosure provides a self-driven water collecting surface having a superhydrophilic-superhydrophobic structure, and a method for preparing the same, belonged to the technical field of water harvesting and superhydrophobic surfaces. The water collecting surface is a superhydrophobic surface with the distributed superhydrophilic region. The superhydrophilic region is a venation channel network structure consisting of hierarchical superhydrophilic channels. In the method, a pulsed laser is firstly adopted to form periodically distributed peak-pit microstructures and nanostructures, which is then modified with a low-surface-energy substance. Then, the low-surface-energy substance layer is removed by a pulsed laser again according to a venation (Continued)

channel network pattern. The laser scanned region is superhydrophilic, while the other regions are superhydrophobic. So that, the self-driven water collecting surface with the superhydrophobic-superhydrophilic structure is obtained.

19 Claims, 8 Drawing Sheets

(51) Int. Cl.
  *B05D 5/08* (2006.01)
  *B23K 26/0622* (2014.01)
  *B23K 26/082* (2014.01)
  *B23K 103/00* (2006.01)
  *B23K 103/14* (2006.01)

(52) U.S. Cl.
  CPC ........ *B23K 26/0624* (2015.10); *B23K 26/082* (2015.10); *B23K 2103/14* (2018.08); *B23K 2103/50* (2018.08)

(56) References Cited

U.S. PATENT DOCUMENTS

| | | | | |
|---|---|---|---|---|
| 2014/0147346 | A1* | 5/2014 | Chitnis | G01N 27/44791 219/121.69 |
| 2019/0234013 | A1* | 8/2019 | Xing | B32B 5/08 |
| 2021/0237203 | A1* | 8/2021 | Zhong | B05D 7/14 |

FOREIGN PATENT DOCUMENTS

| | | |
|---|---|---|
| CN | 104196085 | 12/2014 |
| CN | 104775476 | 7/2015 |
| CN | 105755519 | 7/2016 |
| CN | 205475439 | 8/2016 |
| CN | 205536966 | 8/2016 |
| CN | 107502875 | 12/2017 |
| CN | 206706898 | 12/2017 |
| CN | 107700591 | 2/2018 |
| CN | 207003543 | 2/2018 |
| CN | 107937915 | 4/2018 |

OTHER PUBLICATIONS

A Simple Way To Achieve Pattern-Dependent Tunable Adhesioning Superhydrophobic Surfaces by a Femtosecond Laser, ACS Applied Materials& Interfaces, 2012, 9, 4905-4912.

ISR of PCT/CN2018/115468.

Zheng, Huanxi, The Research on Pumpless Transport of Liquid on Extreme Wettability Surface. Basic Sciences, China Master's Theses Full-Text Database. No. No. 4, Apr. 15, 2018. ISSN:1674-0246, pp. A004-A035.

* cited by examiner

SELF-DRIVEN WATER COLLECTING SURFACE WITH SUPERHYDROPHOBIC-SUPERHYDROPHILIC STRUCTURE AND METHOD FOR PREPARING THE SAME

CROSS-REFERENCE TO RELATED APPLICATION

This application claims priority of China Patent Application No. 201810687964.6, filed on Juan 28, 2018, entitled "SELF-DRIVEN WATER COLLECTING SURFACE WITH SUPERHYDROPHOBIC-SUPERHYDROPHILIC STRUCTURE AND METHOD FOR PREPARING THE SAME", the content of which are hereby incorporated by reference in its entirety. This application is a 35 U.S.C. § 371 national application of international patent application PCT/CN2018/115468, filed on Nov. 14, 2018, the content of which is also hereby incorporated by reference in its entirety.

FIELD

The present disclosure relates to the technical field of water harvesting and superhydrophobic surfaces, and more specifically, to a self-driven water collecting surface with a superhydrophobic-superhydrophilic structure and a method for preparing the same.

BACKGROUND

Water is an essential resource for human survival. The total amount of water resources on the earth is large; however, there are few freshwater resources available for human use. The uneven distribution of water resources makes it difficult to obtain freshwater in some places. In arid mountainous and desert areas with very low rainfall and scarce surface water resources, humans often lack effective ways to obtain freshwater resources. In some islands and coastal areas, although the surface water is abundant, the surface water is mostly salt water which cannot be directly used by humans. Although rainfall is scarce in these areas, there is a lot of water in the air. For example, the humidity is much higher at night in desert areas, and is very high during both day and night in islands and coastal areas. If water can be harvested from the air, water scarcity in these areas can be greatly alleviated. If an efficient water harvesting scheme can be designed, the scheme may be of great significance in alleviating the global water crisis.

For the living creatures in deserts, water is the most precious resource. Whoever can get water can adapt to the survival rules of the deserts. Beetles and cacti have evolved excellent water collecting skills in the severe competition for survival. Beetles are capable of collecting water by using structures with alternatively distributed hydrophobic and hydrophilic regions on their backs. Cacti are capable of collecting water by using their unique spines. Inspired from the characteristics of these two biological water collecting structures, artificial water collecting devices have been developed. For example, as disclosed in patent documents CN1872533A, CN104196085A, CN105755519A, CN107502875A, CN107700591A, CN206706898U, CN207003543U, etc., water collectors adopting surfaces analogous to the beetle's hydrophilic-hydrophobic regions are made. As disclosed in patent documents CN205536966U, CN205475439U, CN102797279, CN104775476A, etc., water collectors adopting structures analogous to the spines of cacti are made. However, the amounts of water collected by the beetle and cactus-type water collecting schemes are limited only for the survival of these creatures. As such, it is often difficult to collect enough water to meet human needs by copying these two schemes in artificial water collectors. In the case where the beetle-type structure is used to collect water, the collected water is in the form of droplets adhered tightly to the hydrophilic regions of the surfaces, making it difficult to further collect these droplets; moreover, a large number of droplets on these surfaces will weaken the ability of the surfaces to further collect water, and will increase the evaporation loss of the droplets. These all essentially limit the water collection efficiency of the structure, and make this structure difficult to be applied to a large device. For the cactus-type water collecting scheme, the core water collecting part is the spines, and the surface area of the spines is relatively small compared to a flat structure; thus, the working surface is very small, which also essentially limits its water collection capacity. Besides, once the spine structure is enlarged in size, its self-driven transportation function will be lost, which also restricts the application of this structure to a large device. As such, there is a need to provide a new idea to solve the difficulties faced by the above two schemes, and to effectively harvest a large amount of water from the air.

As mentioned above, the back of the beetle has the special surface structure in which hydrophobic and hydrophilic regions are alternatively distributed. If the alternatively distributed hydrophobic and hydrophilic regions can be changed into alternatively distributed superhydrophobic and superhydrophilic regions, this structure can be used not only for water harvesting but also in many fields such as heat transfer, condensation, distillation, mold, salt production and the like, thereby having wide application prospects and great potential. However, existing technologies that can realize the preparation of the superhydrophilic and superhydrophobic patterned surface are very limited. Existing methods for preparing superhydrophilic and superhydrophobic surface include photolithography, coating, plasma treatment, electro-stream treatment, and UV light irradiation. Among them, photolithography and plasma beam irradiation methods have extremely low efficiency, involve expensive equipments, have high processing costs, and thus are difficult to use in mass production; the methods such as coating, electro-stream treatment, and UV light irradiation have low processing accuracy, and thus have difficulties in forming complex superhydrophilic and superhydrophobic patterns with high resolution. CN107937915A discloses a method for preparing patterns in various shapes on a surface of a superhydrophobic film by using the laser direct writing technology. The method initially deposits a Ti film on a substrate, and modifies the film with a layer of fluorosilane to obtain a superhydrophobic film, and then prepares a pattern on the hydrophobic film by using the laser direct writing technology to obtain a surface with differential wettability. However, the principle of this method is melting the superhydrophobic porous surface of the patterned regions by high-temperature laser to make the surface lose the original roughness, thereby reducing the hydrophobicity of the patterned regions. This roughness reducing method can only make the wetting angle smaller, but cannot make the regions exhibit superhydrophilic features. Therefore, this method can be used for producing a surface with contrasting wettability, however, cannot be used for producing a surface consisting of superhydrophobic backgrounds and superhydrophilic patterns. Similarly, in Zhang et al, A Simple Way To Achieve Pattern-Dependent Tunable Adhesioning Superhydrophobic Surfaces by a Femtosecond Laser, ACS Applied Materials & Interfaces, 2012, 9, 4905-4912, different regions of a silicon surface are processed into different structures by using a femtosecond laser to control the adhesion of the surface to water droplets. The resulting binary micro-nano structure surface is composed of periodic hydrophobic and superhydrophobic patterns. These two methods both change the wettability of some regions by reducing the roughness of the regions, but a degree of the change is limited, so that neither of the two methods can be used to prepare a hybrid superhydrophobic-superhydrophilic surface with extreme wettability difference.

SUMMARY

In view of this, the present disclosure provides a superhydrophilic-superhydrophobic composite distributing surface that has a stable structure and a self-driven water collection function with high centralization, and the surface can work continuously. It solves the problem that, during the water collecting process, water droplets are too separated and difficult to be collected and transported. The present disclosure also provides a simple, efficient, and rapid method for preparing the superhydrophilic-superhydrophobic composite surface. The method involves ablating a metal surface by a pulsed laser to prepare a hierarchical micro-nanostructure, modifying the surface to reduce surface free energy (i.e., surface energy) to make the surface exhibit a superhydrophobic feature, then ablating the superhydrophobic surface by performing a second laser treatment on the surface with a pulsed laser to prepare a venational superhydrophilic channel network, thereby making the surface possess a self-driven water collection function with high centralization. The surface has broad application prospects in the fields of water harvest, heat exchange, and water desalination.

A self-driven water collecting surface having a superhydrophilic-superhydrophobic structure includes a superhydrophilic region distributed on a superhydrophobic surface. The superhydrophilic region is a venation channel network structure including hierarchical superhydrophilic channels.

Optionally, the venation channel network structure is composed of channels of different orders connected to each other, and the total number of orders can be from two to five. Taking a four-order channel system as an example, a first-order channel is located at the center; second-order channels extend from both sides of the first-order channel, a wider end of the second-order channel being connected to the first-order channel; third-order channels extend from both sides of the second-order channel; and fourth-order channels extend from both sides of the third-order channel.

Optionally, the superhydrophilic channels are divided into two types: primary channels (e.g., the first-, and second-order channels), which are responsible for directional transportation of the collected water, and secondary channels (e.g., the third-, fourth-, and fifth-order channels), which are responsible for collecting water and transporting the collected water to the primary channels.

Optionally, the superhydrophilic primary channels, such as the first- and second-order channels, are asymmetric wedge-shaped structures with an included angle of 2° to 30° and a length of about 0.5 cm to about 20 cm. The width of the second-order channel is smaller than that of the first-order channel. The asymmetric second-order channels branch from the first-order channels and extend toward the venation margins. The superhydrophilic secondary channels, such as the third- and fourth-order channels, are constant-width channels with widths less than the maximum width of the second-order channels. For the secondary channels, the channels at different orders have different widths, the higher the order, the smaller the width of the channel, and the widths are ranged from about 30 microns to about 300 microns. The secondary channels are intercrossed with each other to constitute a dense network, and are distributed around the primary channels. The spacing between adjacent secondary channels is about 0.05 mm to about 10 mm.

The present disclosure provides an embodiment of a method for preparing a superhydrophilic-superhydrophobic composite surface having a self-driven continuous water collection function with high centralization by using an ultra-fast laser. The embodiment of the method includes the following steps:

S1, ablating a metal surface by a first pulsed laser to form periodically distributed peak-pit microstructures including alternately and densely distributed micro-peaks and micro-pits, and to form nanostructures, such as nanoparticles or nanovilli, distributed on the peak-pit microstructures;

S2, modifying the metal surface treated by the first pulsed laser with a low-surface-energy substance to form the metal surface into a superhydrophobic surface;

S3, drawing a venation channel network pattern using computer drawing software; and S4, scanning the superhydrophobic surface prepared as above by a second pulsed laser according to the venation channel network pattern to remove the low-surface-energy substance layer in the laser scanned region of the surface without destruction of the micro-nano structure, so that the laser scanned region of the surface is converted from superhydrophobic to superhydrophilic, while the untreated regions of the surface still exhibit superhydrophobic features, thereby obtaining the superhydrophobic-superhydrophilic composite surface which is a self-driven water collecting surface with a superhydrophobic-superhydrophilic structure.

In an embodiment, each of the first and second pulsed lasers in the above steps S1 and S4 is one or more of a nanosecond laser, a picosecond laser, and a femtosecond laser, with laser wavelength not being limited.

In an embodiment, in the peak-pit microstructures described in step S1, the micro-peak has a diameter of about 20 microns to about 120 microns and a height of about 20 microns to about 160 microns, and a spacing between adjacent micro-peaks is about 20 microns to about 120 microns; the micro-pit has a diameter of about 20 microns to about 120 microns and a depth of about 10 microns to about 50 microns, and a spacing between adjacent micro-pits is about 20 microns to about 120 microns. A size of the nanoparticle or the nanovillus is less than 800 nanometers.

The modification with the low-surface-energy substance in the step S2 can be a liquid-phase modification or a gas-phase modification. In an embodiment, the liquid-phase modification includes: formulating a dilute solution of lauric acid or 1H, 1H, 2H, 2H-perfluorodecyl trimethoxysilane in methanol or ethanol in a mass concentration of about 0.1% to about 5%; immersing the laser-treated surface in the dilute solution for about 1 hour to about 2 hours; and drying the surface by heating in a drying oven at about 80° C. to about 100° C. In another embodiment, the gas-phase modification includes heating the laser-treated surface together with about 0.5 g to about 5 g of 1H, 1H, 2H, 2H-perfluorodecyl trimethoxysilane in a drying oven at about 80° C. to about 100° C. for about 0.5 hours to about 2 hours.

The embodiments of the present disclosure have at least one of the following advantages and outstanding technical effects.

(1) In the multi-order venational (or leaf-vein shaped) superhydrophilic channel network of an embodiment of the present disclosure, the secondary channels are densely distributed on the entire surface, which can maximize the collection of the water on the surface and capture almost all water droplets on the water collecting surface.

(2) In the multi-order venational superhydrophilic channel network of an embodiment of the present disclosure, the primary channel is wedge-shaped. The droplet has a surface curvature presenting an asymmetric distribution along the main axis of the channel when existing on the wedge-shaped structure, with smaller curvature on the wider side of the wedge and greater curvature on the narrower side. This difference in curvature of the two ends of the droplet leads to a difference in the Laplace pressure inside the droplet. The Laplace pressure will push the droplet towards the wider end of the wedge, realizing the self-driven transportation of the droplet, and the driving force is the Laplace pressure difference.

(3) In the embodiments of the present disclosure, the idea of multi-order venational superhydrophilic channel network is proposed to be used for water collection, which involves connecting the wedge-shaped primary channels into a dendritic shape, and connecting the constant-width secondary channels into a densely distributed network distributed around the primary channels, thereby making the network of the entire channel system similar to the venation network system. The multi-order channels under the synergistic effect can transport the collected water to the designated location along the multi-order channels order-by-order in a completely spontaneous way to realize the self-driven water collection with high centralization, and can collect water against gravity.

(4) Since the water collected by the surface provided by the present disclosure has been transported to the designated location, the amount of water remaining on the surface is very small, which avoids the surface being clogged up with the collected water, in order to avoid reduction of water collection efficiency and interruption of the water collecting process, ensuring that the surface is capable of collecting water continuously and constantly.

(5) Since the water collected by the surface provided by the present disclosure has been transported to the designated location in time, the total surface area of the water is reduced, which can effectively reduce the evaporation loss of the water droplets, thereby improving the water collection efficiency.

(6) The micro-nano roughness of superhydrophobic and superhydrophilic coatings containing micro-nano particles is difficult to maintain, as the particles are easy to fall off and move. In the embodiments of the present disclosure, the method including the pulsed laser ablation, the surface modification, and the pulsed laser treatment is used to prepare the superhydrophilic-superhydrophobic composite surface which is robust and stable, guaranteeing the stability of superhydrophobicity and superhydrophilicity, and fundamentally solving the problem that the micro-nano roughness is difficult to maintain, that is, solving the problem that the superhydrophobicity is difficult to maintain.

(7) Since the second laser treatment in the embodiment of the present method can retain the original roughness of the superhydrophilic surface while removing the low-surface-energy substance on the surface, the treated region of the surface after the second laser treatment can exhibit the superhydrophilic property.

(8) The laser treatment that forms the superhydrophilic pattern on the superhydrophobic surface has the advantages of good controllability, high precision, and high efficiency compared with the methods such as mechanical removal and ultraviolet irradiation, and can be applied to different materials with good material compatibility.

(9) The multi-order venational superhydrophilic channel network system in the embodiments of the present disclosure can be produced by various processes and has good process compatibility, and can be applied to various materials and has good material compatibility.

In summary, the present disclosure proposes a water harvesting scheme with a venational channel network structure. The water collecting surface based on this scheme is stable in structure, has a self-driven water collection function with high centralization and relatively high water collection efficiency, can continuously and constantly transport water to a designated location, continuously free up space for subsequent water collection, thereby maintaining the efficiency for a long time, and having a long time efficient work.

The present disclosure provides a method using pulsed laser processing technology for preparing this structure. The method is simple, efficient and controllable, and can precisely adjust structural parameters in micrometer level. The superhydrophilic-superhydrophobic patterns can be freely adjusted according to actual situation, and the complex superhydrophilic-superhydrophobic patterns can be prepared in large scale by the method. The water harvesting scheme with the venational network structure in the present disclosure not only makes it possible to truly scaled up the water collecting device and greatly improve the water collection efficiency, but also can be applied to many fields such as distillation, water desalination, heat transfer, etc., and, in particular, can exert unexpected effects when there is a need to accurately control the amount and the flow direction of condensed water.

BRIEF DESCRIPTION OF THE DRAWINGS

To more clearly explain the technical solutions of the present disclosure, a brief introduction to the drawings referred in the description of the embodiments is given below. Obviously, the drawings in the following description only show embodiments of the present disclosure. Those of ordinary skill in the art can obtain other drawings based on the following drawings without any creative work.

DETAILED DESCRIPTION

To make the objects, technical solutions, and advantages of the present disclosure more clear, the self-driven water collecting surface with a superhydrophobic-superhydrophilic structure and the method for preparing the same of the present disclosure are described in the following description through embodiments and drawings. It should be understood that the specific embodiments described herein are only used to explain the present disclosure, and are not used to limit the present disclosure.

Figure 1:
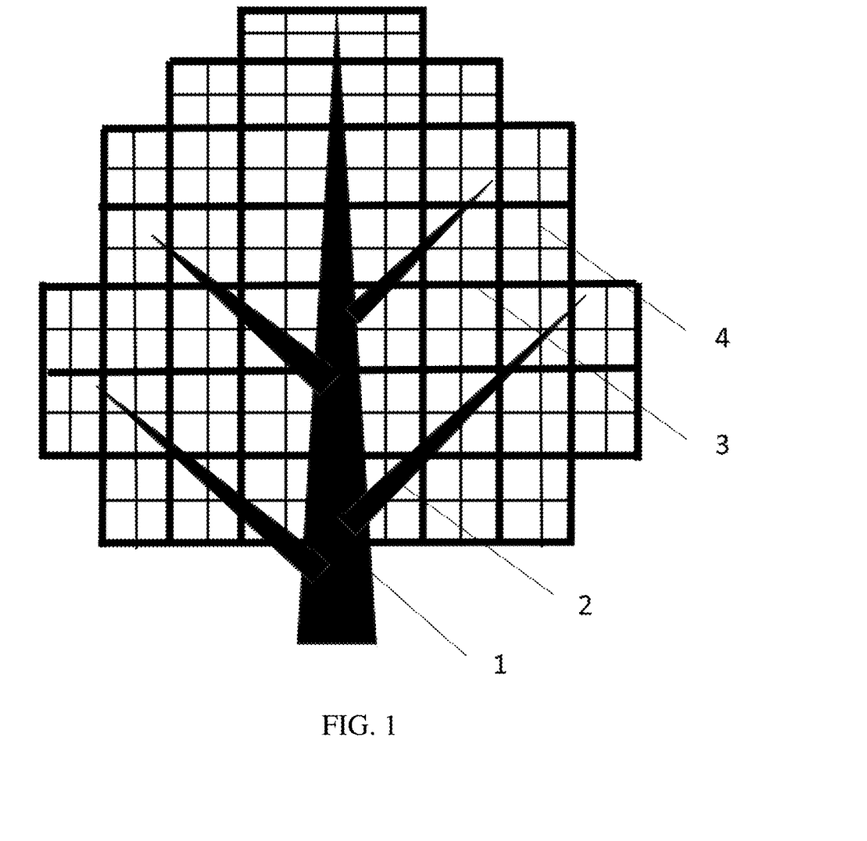
FIG. 1 is a schematic structural view of an embodiment of a venation channel network structure in the present disclosure. In the drawing, 1-first-order channel, 2-second-order channel, 3-third-order channel, 4-fourth-order channel.
Figure 2A:
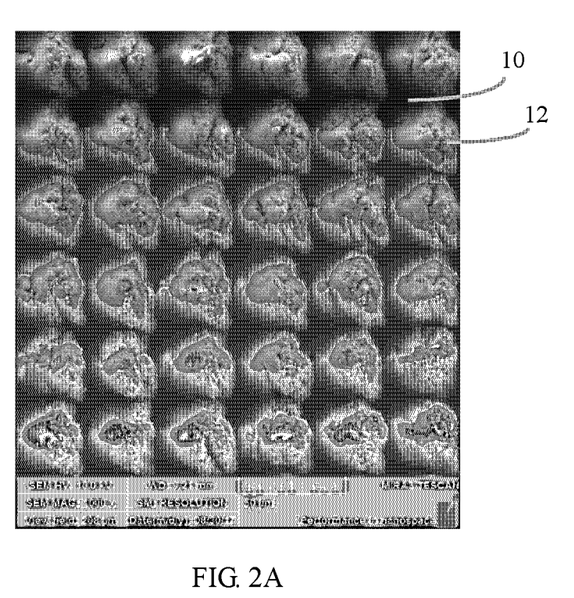
FIG. 2A and FIG. 2B respectively show scanning electron microscope (SEM) images of periodically distributed peak-pit microstructures and nanoparticles thereon in a superhydrophobic region in Example 1 of the present disclosure, wherein a micro-pit is labeled as 10, a micro-peak is labeled as 12, and a nanoparticle is labeled as 14.
Figure 2B:
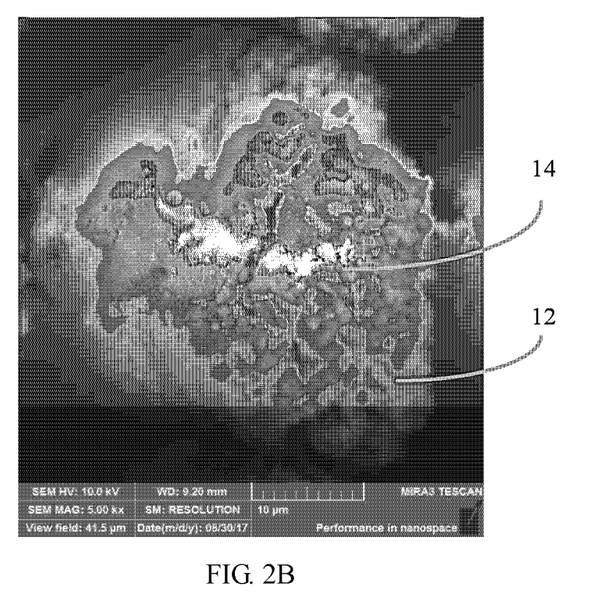
Figure 3A:
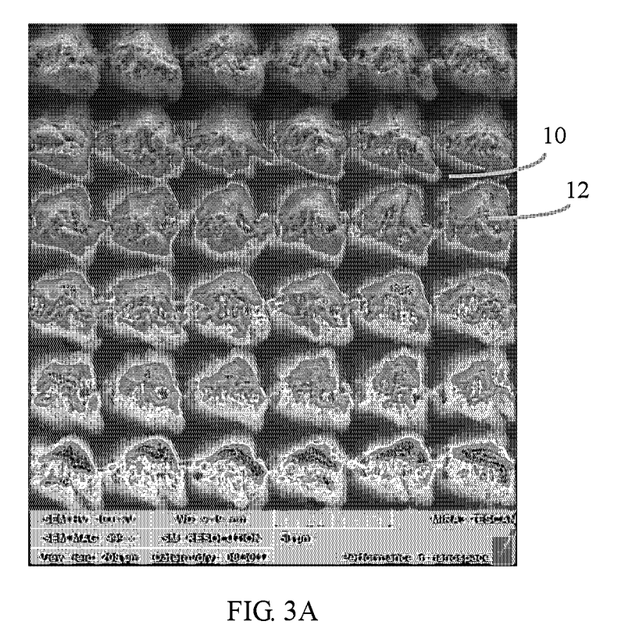
FIG. 3A and FIG. 3B respectively show SEM images of periodically distributed peak-pit microstructures and nanoparticles thereon in a superhydrophilic region in Example 1 of the present disclosure, wherein a micro-pit is labeled as 10, a micro-peak is labeled as 12, and a nanoparticle is labeled as 14.
Figure 3B:
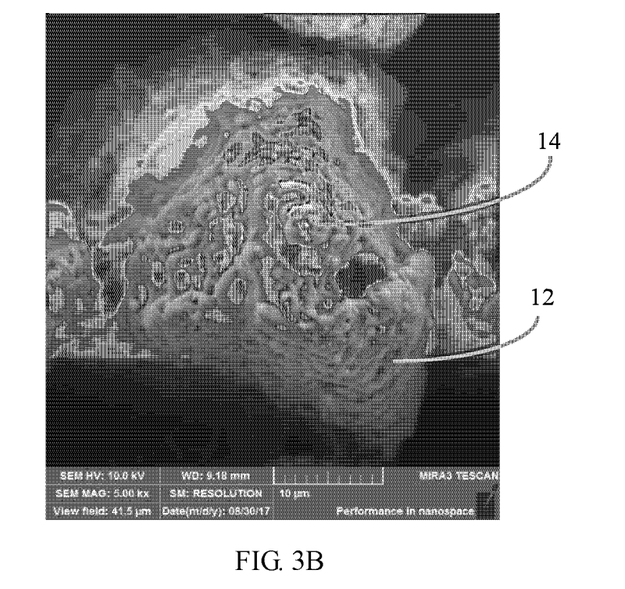
Figure 4A:
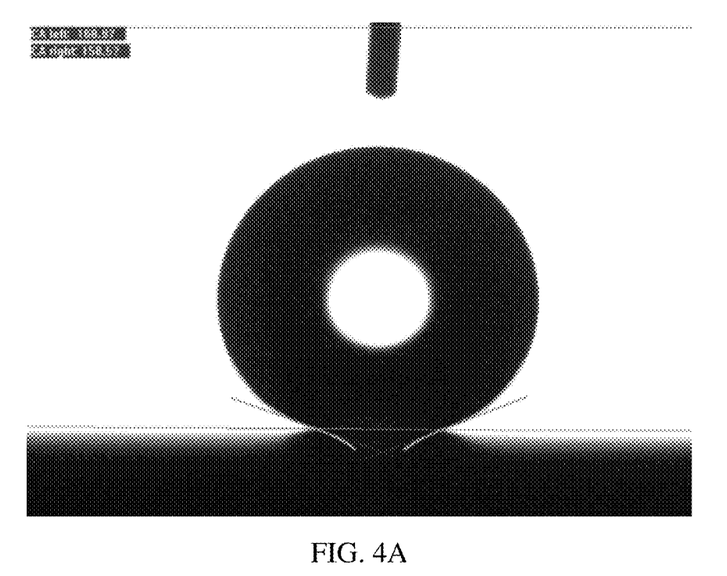
FIG. 4A and FIG. 4B respectively show photographs of contact angles of the superhydrophobic region and the superhydrophilic region in Example 1 of the present disclosure.
Figure 4B:
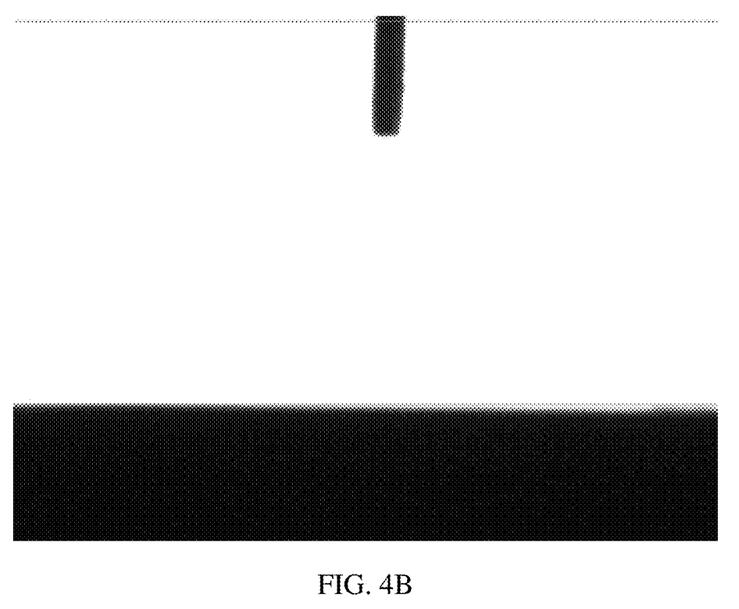

Referring to FIG. 1, an embodiment of the present disclosure provides a self-driven water collecting surface with a superhydrophilic-superhydrophobic structure including a superhydrophilic region distributed on a superhydrophobic surface. The superhydrophilic region is a venation (or leaf-vein shaped) channel network structure that consists of hierarchical (or multi-order) superhydrophilic channels. The venation channel network structure is composed of channels of different orders connected to each other, and the total number of orders can be from two to five. Taking a four-order channel system as an example, a first-order channel 1 is located at the center; second-order channels 2 extend from both sides of the first-order channel 1, a wider end of the second-order channel 2 being connected to the first-order channel 1; third-order channels 3 extend from both sides of the second-order channel 2; and fourth-order channels 4 extend from both sides of the third-order channel 3. Primary channels (e.g., the first-order, and second-order channels) are responsible for directional transportation of the collected water. Secondary channels (e.g., third-order, fourth-order, or fifth-order channels) are responsible for collecting water and transferring the collected water to the primary channels. The superhydrophilic primary channels are asymmetric wedge-shaped structures with an included angle of 2° to 30° and a length of about 0.5 cm to about 20 cm. The secondary channels are constant-width channels with widths less than the maximum width of the second-order channels. For the secondary channels, the channels at different orders have different widths, the higher the order, the smaller the width of the channel, and the widths are ranged from about 30 microns to about 300 microns. The secondary channels are intercrossed with each other to constitute a dense network, and are distributed around the primary channels. The spacing between adjacent secondary channels is about 0.05 mm to about 10 mm.

When condensing water or collecting mist, the densely distributed secondary channels are mainly responsible for collecting the water on the water-collecting surface and transporting the water to the primary channels, and the primary channels are responsible for transporting the water collected by the secondary channels to the designated location. Since the secondary channels are high densely distributed, almost all of the water collected on the water-collecting surface of the embodiment of the present disclosure can be further collected by the secondary channels, thereby realizing a complete collection of the water on the entire water-collecting surface. Since the transportation of the water is completed in cooperation between the primary channels and the secondary channels, the collected water can be continuously transported to a location beyond the surface, freeing up space on the surface for the subsequent water collection. Moreover, since the water collected on the surface can be quickly transported to the designated location by the multi-order channel system, the evaporation loss during the water collecting process can be reduced, thereby improving the water collection efficiency.

An embodiment of the present disclosure provides a method for preparing a surface with self-driven water collection function, the method including steps as follows.

1) Initial pulsed laser processing:

Ultra-short (or ultrafast) pulsed laser is used to ablate a surface of a sample to produce a periodic peak-pit microarray by the initial laser ablation. The microarray has abundant nanoparticles and nanovilli. The micro-peak has a diameter of about 20 microns to about 120 microns, and a height of about 20 microns to about 160 microns. Spacing between adjacent micro-peaks is about 20 microns to about 120 microns. The micro-pit has a diameter of about 20 microns to about 120 microns, and a depth of about 10 microns to about 50 microns. Spacing between adjacent micro-pits is about 20 microns to about 120 microns. A size of the nanoparticle or the nanovillus is less than 800 nanometers. The ultra-short pulsed laser is a femtosecond laser, a picosecond laser, or a nanosecond laser.

2) Surface modification of the laser-processed sample:

The laser-processed surface is modified with a low-surface-energy substance. After the modification, the modified surface of the sample shows superhydrophobic property, with a contact angle greater than 160° and a roll-off angle less than 3°. The modification with the low-surface-energy substance is a liquid-phase modification that includes steps of formulating a dilute solution of lauric acid or 1H, 1H, 2H, 2H-perfluorodecyl trimethoxysilane with a mass concentration of about 0.1% to about 5% in methanol or ethanol; immersing the laser-treated surface in the dilute solution for about 1 hour to about 2 hours; and drying the surface by heating in a drying oven. The heating temperature is about 60° C. to about 120° C. The heating time is about 1 hour to about 2 hours. Alternatively, the modification with the low-surface-energy substance is a gas-phase modification that includes steps of putting lauric acid or 1H, 1H, 2H, 2H-perfluorodecyl trimethoxysilane in a wind heating oven, and heating at a temperature of about 60° C. to about 120° C. for about 1 hour to about 2 hours.

3) Drawing a venation channel network pattern using drawing software:

The drawing software can be a commercial drawing software such as an Autodesk® Computer Aided Design (CAD) software. The venation channel network pattern is a network system pattern composed of multi-order channels. The multi-order channels are mainly divided into two types of channels: the primary channels and the secondary channels. The primary channels are wedge-shaped structures, connected to each other to form a shape like a tree, similar to a trunk-branch structure. The secondary channels are parallel and constant-width structures, intercrossing with each other to constitute a densely distributed network, and being distributed around the primary channels. For both of the primary channels and the secondary channels, the channel with greater size has smaller order, and vice versa.

4) Second pulsed laser processing:

Ultrafast pulsed laser is used to ablate the superhydrophobic surface to produce a venation channel network pattern by the second laser ablation. The region subjected to the ultrafast laser ablation is converted from superhydrophobic to superhydrophilic, while the regions not subjected to the laser ablation still maintain superhydrophobic. As such, the water collecting surface has the superhydrophobic-superhydrophilic composite structure in which the multi-order superhydrophilic venation channel network has a self-driven water collection function with high centralization and efficiency.

EXAMPLES

Unless otherwise specified, the materials and reagents used in the following examples are commercially available.

Example 1

1) Preparing a sample:

An aluminum alloy plate with a thickness of about 4 mm was ultrasonically cleaned with alcohol or acetone, and dried for later use.

2) Initial pulsed laser processing:

Femtosecond laser in cooperation with an x-y galvanometric scanner was used to ablate a surface of the sample to produce periodically distributed peak-pit microstructures, and to form abundant nanostructures on these microstructures. A height from the micro-peak to the micro-pit was 48 microns. A diameter of the micro-peak was 20 microns. A spacing between adjacent micro-peaks was 35 microns. A diameter of the micro-pit was 20 microns. A depth of the micro-pit was 10 microns. A spacing between adjacent micro-pits was 35 microns. A size of the nanostructure is less than 800 nanometers.

3) Liquid-phase modification:

A dilute solution of lauric acid with a mass concentration of about 0.1% to about 5% in methanol or ethanol was formulated. The laser-treated surface was immersed in the dilute solution for about 2 hours, and then dried by heating in a drying oven, to obtain a superhydrophobic surface having a water contact angle of about 160°.

4) Drawing a quadrangular venation channel network pattern using computer drawing software:

The outline of the pattern was a quadrangle. The pattern included two types of channels: the superhydrophilic primary channels which were asymmetric wedge-shaped structures with an included angle of 10° and a length of about 0.5 cm, and the constant-width secondary channels with a length of about 0.5 cm and a width of about 30 microns. The secondary channels were intercrossed with each other to constitute a dense network, and distributed around the primary channels. The spacing between the adjacent secondary channels was about 0.05 mm.

5) Second pulsed laser processing:

Femtosecond laser was used to ablate the superhydrophobic surface to draw the quadrangular venation channel network pattern on the superhydrophobic surface. Referring to FIGS. 2A to 2B, FIGS. 3A to 3B, and FIGS. 4A to 4B, the region ablated by the ultrafast laser exhibited superhydrophilic property with a contact angle of 0°, while the regions not ablated by the laser still maintained superhydrophobic property with a contact angle of 160°. By this step, the desired surface with the self-driven water collecting function was obtained.

6) Condensed water collection test and mist water collection test were conducted by using the sample. In the tests, the sample with the superhydrophilic-superhydrophobic composite surface exhibited the self-driven continuous water collection function with high centralization.

Example 2

1) Preparing an iron-carbon alloy sample:

An iron-carbon alloy plate with a thickness of about 4 mm was ultrasonically cleaned with alcohol or acetone, and dried for later use.

2) Initial pulsed laser processing:

Picosecond laser in cooperation with x-y galvanometric scanner was used to ablate a surface of the sample to produce periodically distributed peak-pit microstructures, and to form abundant nanostructures on these microstructures. A diameter of the micro-peak was 20 microns. A height of the micro-peak was 20 microns. A spacing between adjacent micro-peaks was 20 microns. A diameter of the micro-pit was 20 microns. A depth of the micro-pit was 10 microns. A spacing between adjacent micro-pits was 20 microns. A size of the nanostructure is less than 800 nanometers.

3) Gas-phase modification:

The sample was placed together with 1 g of 1H, 1H, 2H, 2H-perfluorodecyl trimethoxysilane in a high-temperature wind heating oven, and heated at a temperature of about 120° C. for about 0.5 hours to obtain a superhydrophobic surface having a water contact angle of about 160°.

4) Drawing a pentagonal venation channel network pattern using computer drawing software:

The outline of the pattern was a pentagon. The pattern included four orders of channels. The first- and second-order superhydrophilic primary channels were asymmetric wedge-shaped structures. The first-order channel had an included angle of 2° and a length of about 4 cm, and the second-order channels had an included angle of 2° and a length of about 2 cm. The third- and fourth-order superhydrophilic secondary channels were constant-width channels. The widths of the third- and fourth-order superhydrophilic secondary channels were respectively about 70 microns and about 140 microns. The lengths of the third- and fourth-order superhydrophilic secondary channels were about 0.5 cm. The secondary channels were intercrossed with each other to constitute a dense network, and distributed around the primary channels. The spacing between the adjacent secondary channels was about 0.5 mm.

Figure 7A:
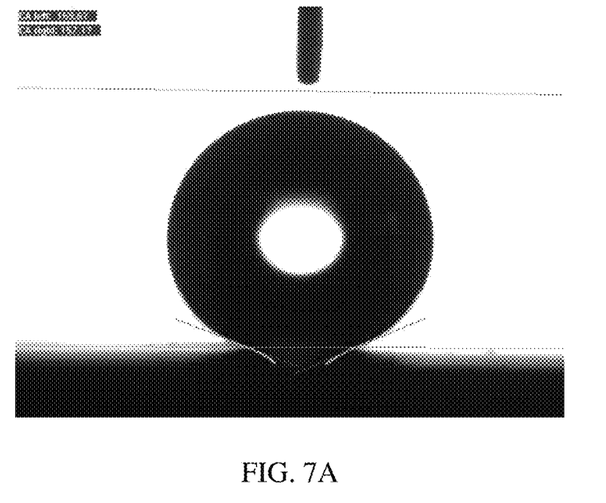
FIG. 7A and FIG. 7B respectively show photographs of contact angles of the superhydrophobic region and superhydrophilic region in Example 2 of the present disclosure.
Figure 7B:
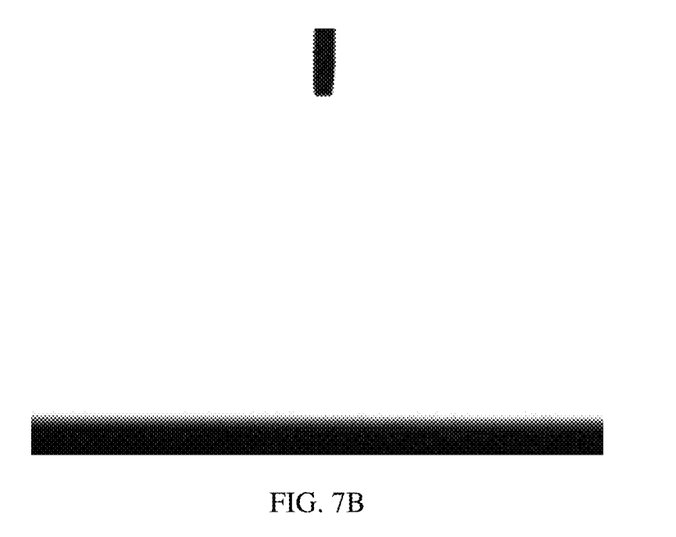

5) Second pulsed laser processing:

Referring to FIGS. 7A to 7B, femtosecond laser was used to ablate the superhydrophobic surface to draw the pentagonal venation channel network pattern. The region ablated by ultrafast laser exhibited superhydrophilic property with a contact angle of 0°, while the region not ablated by laser ablation still maintained superhydrophobic property with a contact angle of 160°. By this step, the desired surface with the self-driven water collecting function was obtained.

Figure 5:
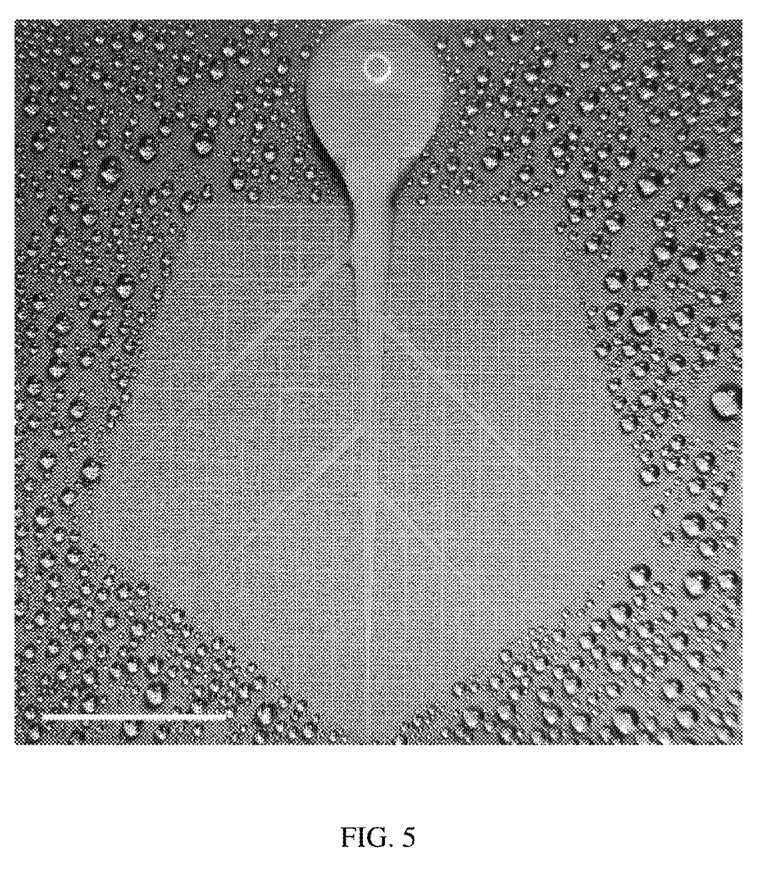
FIG. 5 shows a photograph of Example 2 of the structure in collecting water.
Figure 6:
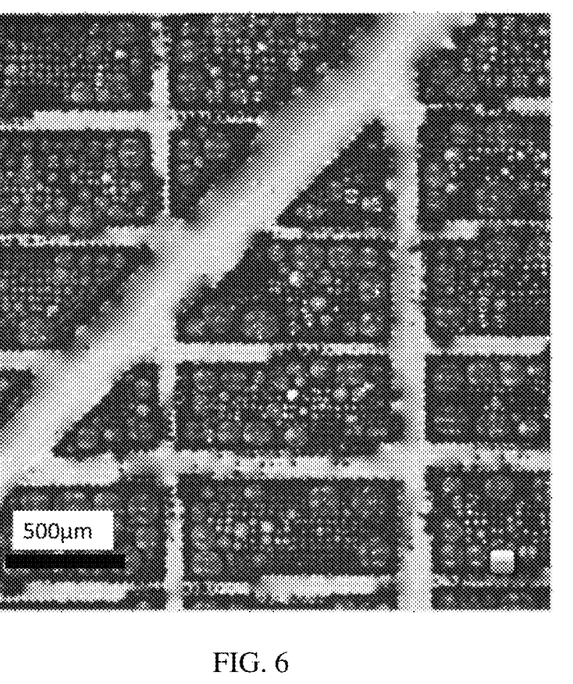
FIG. 6 shows a photograph in a microscopic view of Example 2 of the structure in collecting water.
Figure 8:
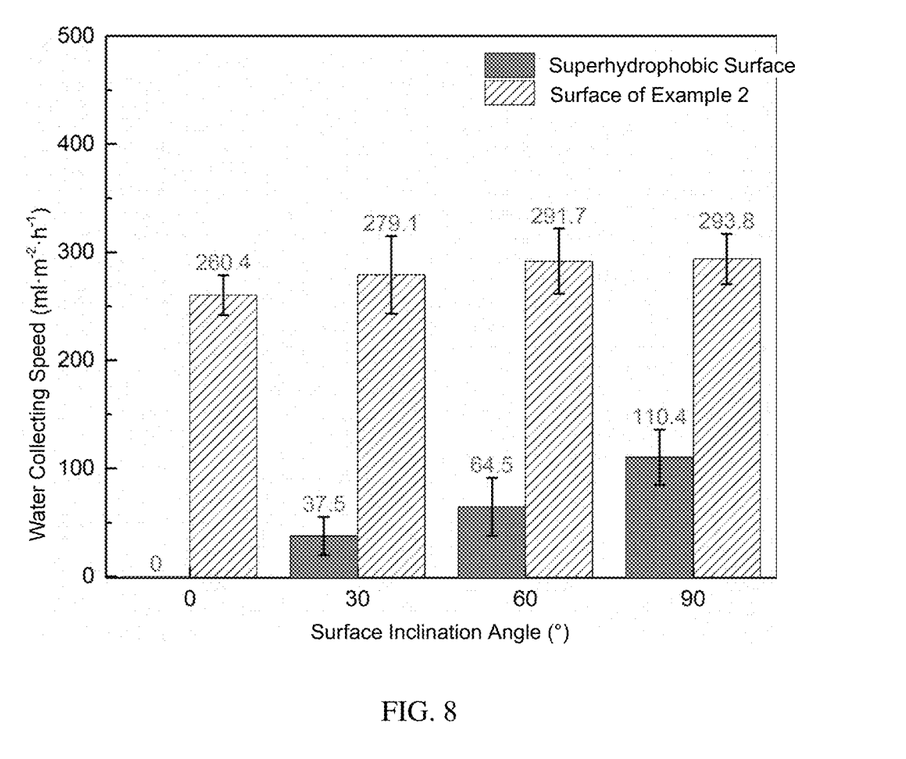
FIG. 8 is a graph comparing amounts of water per unit time and per unit area collected by the structure in Example 2 of the present disclosure and a superhydrophobic surface.

6) Condensed water collection test and mist water collection test were conducted by using the sample. Referring to FIGS. 5, 6, and 8, in the tests, the sample with the superhydrophobic-superhydrophilic composite surface exhibited the self-driven continuous water collection function with high centralization.

Example 3

1) Preparing a titanium alloy sample:

A titanium alloy plate was ultrasonically cleaned with alcohol or acetone, and dried for later use.

2) Initial pulse laser processing:

Nanosecond laser in cooperation with x-y galvanometric scanner was used to ablate a surface of the sample to produce periodically distributed peak-pit microstructures, and to form abundant nanostructures on these microstructures. A diameter of the micro-peak was 20 to 120 microns. A height of the micro-peak was 20 to 160 microns. A spacing between adjacent micro-peaks was 20 to 120 microns. A diameter of the micro-pit was 120 microns. A depth of the micro-pit was 50 microns. A spacing between adjacent micro-pits was 120 microns. A size of the nanostructure is less than 800 nanometers.

3) Gas-phase modification:

The sample was placed together with 1 g of 1H, 1H, 2H, 2H-perfluorodecyl trimethoxysilane in a high-temperature wind heating oven, and heated at a temperature of about 60° C. for about 2 hours to obtain a superhydrophobic surface having a water contact angle of about 160°.

4) Drawing a quadrangular venation channel network pattern using computer drawing software:

The outline of the pattern was a quadrangle. The pattern included five orders of channels. The first- and second-order superhydrophilic primary channels were asymmetric wedge-shaped structures. The first-order channel had an included angle of 2° and a length of about 20 cm, and the second-order channels had an included angle of 3° and a length of about 5 cm. The third-, fourth-, and fifth-order superhydrophilic secondary channels were constant-width channels. The widths of the third-, fourth-, and fifth-order superhydrophilic secondary channels were respectively about 30 microns, 140 microns, and 300 microns. The lengths of the third-, fourth-, and fifth-order superhydrophilic secondary channels were about 20 cm. The secondary channels were intercrossed with each other to constitute a dense network, and distributed around the primary channels. The spacing between the adjacent secondary channels was about 10 mm.

Figure 9A:
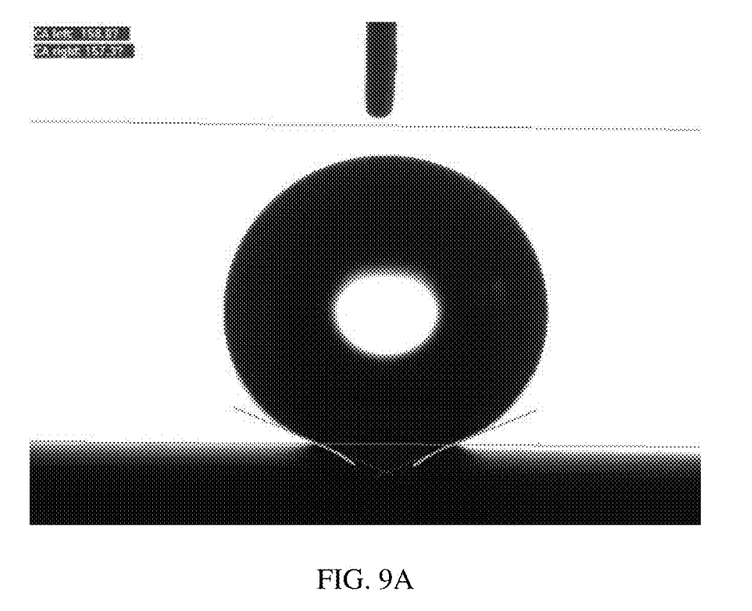
FIG. 9A and FIG. 9B respectively show photographs of contact angles of the superhydrophobic region and superhydrophilic region in Example 3 of the present disclosure.
Figure 9B:
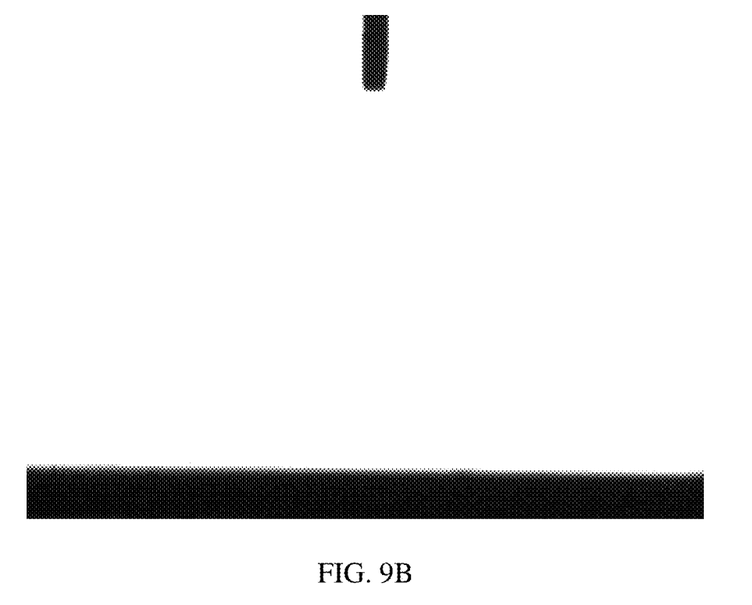

5) Second pulse laser processing:

Referring to FIGS. 9A to 9B, nanosecond laser was used to ablate the superhydrophobic surface to draw the quadrangular venation channel network pattern. The region ablated by ultrafast laser exhibited superhydrophilic property with a contact angle of 0°, while the region not ablated by laser still maintained superhydrophobic property with a contact angle of 160°. By this step, the desired surface with the self-driven water collecting function was obtained.

6) Condensed water collection test and mist water collection test were conducted by using the sample. In the tests, the sample with the superhydrophobic-superhydrophilic composite surface exhibited the self-driven continuous water collection function with high centralization.

The technical features of the embodiments described above can be combined arbitrarily. To simplify the description, all possible combinations of the technical features in the above embodiments are not described, however, they should be regarded as within the scope of this description, as long as there is no contradiction in the combination of these technical features.

The above-mentioned embodiments only exemplify several implementations of the present disclosure, which are described more specifically and in detail but cannot be understood as limiting the scope of the present disclosure. It should be noted that, for a person of ordinary skill in the art, without departing from the concept of the present disclosure, some modifications and improvements can be made, which all fall within the protection scope of the present disclosure. Therefore, the protection scope of the present disclosure shall be subject to the appended claims.

What is claimed is:

1. A self-driven water collecting surface having a superhydrophilic-superhydrophobic structure, wherein the water collecting surface comprises a superhydrophilic region and a superhydrophobic region, and the superhydrophobic region is a superhydrophobic surface, the superhydrophilic region is a venation channel network structure comprising superhydrophilic channels of different orders connected to each other;

the superhydrophilic-superhydrophobic structure comprises:

periodically distributed peak-pit microstructures comprising alternately distributed micro-peaks and micro-pits, and nanostructures distributed on the peak-pit microstructures;

wherein in the superhydrophobic surface, the superhydrophilic-superhydrophobic structure further comprises a superhydrophobic substance located on the peak-pit microstructures.

2. The self-driven water collecting surface of claim 1, wherein a total number of the orders is from two to five.

3. The self-driven water collecting surface of claim 2, wherein the total number of the orders is four, the superhydrophilic channels of different orders are:

a first-order channel located at a center of the water collecting surface;

second-order channels extended from both sides of the first-order channel, each of the second-order channels comprising a wider end and a narrower end, the wider end of the each of the second-order channels being connected to the first-order channel;

third-order channels extended from both sides of the each of the second-order channels; and fourth-order channels extend from both sides of the each of the third-order channels.

4. The self-driven water collecting surface of claim 1, wherein the superhydrophilic channels are primary channels and secondary channels, the secondary channels are configured for collecting water from the superhydrophobic surface and transporting the water to the primary channels, the primary channels are configured for directional transporting the water to a designated location.

5. The self-driven water collecting surface of claim 4, wherein a total number of the orders is five, the superhydrophilic channels of different orders are a first-order channel, second-order channels, third-order channels, fourth-order channels, and fifth-order channels; the first-order channel and the second-order channels are the primary channels; the third-order channels, the fourth-order channels, and the fifth-order channels are the secondary channels.

6. The self-driven water collecting surface of claim 5, wherein each of the primary channels is a wedge-shaped structure with an included angle of 2° to 30° and a length of about 0.5 cm to about 20 cm, and a width of the second-order channels is smaller than a width of the first-order channel.

7. The self-driven water collecting surface of claim 6, wherein each of the secondary channels is a constant width channel with a width less than a maximum width of the second-order channels, the secondary channels at different orders have different widths, the higher the order, the smaller the width of the secondary channels.

8. The self-driven water collecting surface of claim 4, wherein the secondary channels are intercrossed with each other to constitute a network, and are distributed around the primary channels.

9. A preparing method of the self-driven water collecting surface of claim 1, comprising following steps:
   ablating a metal surface by a first pulsed laser to form periodically distributed peak-pit microstructures comprising alternately distributed micro-peaks and micro-pits, and to form nanostructures distributed on the peak-pit microstructures;
   modifying the metal surface ablated by the first pulsed laser with a low-surface-energy substance to form the metal surface into a superhydrophobic surface;
   drawing a venation channel network pattern using computer drawing software;
   scanning the superhydrophobic surface by a second pulsed laser according to the venation channel network pattern to remove the low-surface-energy substance in a laser scanned region of the superhydrophobic surface without destroying the peak-pit microstructures and the nanostructures, thereby converting the laser scanned region of the superhydrophobic surface from superhydrophobic to superhydrophilic, while other regions of the superhydrophobic surface are still superhydrophobic.

10. The method of claim 9, wherein each of the first pulsed laser and the second pulsed laser is a nanosecond laser, a picosecond laser, or a femtosecond laser.

11. The method of claim 9, wherein the modifying is liquid-phase modifying, comprising:
   formulating a dilute solution of lauric acid or 1H, 1H, 2H, 2H-perfluorodecyl trimethoxysilane in methanol or ethanol in a mass concentration of about 0.1% to about 5%;
   immersing the metal surface ablated by the first pulsed laser in the dilute solution for about 1 hour to about 2 hours; and
   drying the metal surface by heating in a drying oven at about 80° C. to about 100° C.

12. The method of claim 9, wherein the modifying is gas-phase modifying, comprising:
   heating the metal surface ablated by the first pulsed laser together with about 0.5 g to about g of 1H, 1H, 2H, 2H-perfluorodecyl trimethoxysilane in a drying oven at about 80° C. to about 100° C. for about 0.5 hours to about 2 hours.

13. The self-driven water collecting surface of claim 8, wherein spacing between adjacent secondary channels is about 0.05 mm to about 10 mm.

14. The self-driven water collecting surface of claim 1, wherein each of the micro-peaks has a diameter of about 20 microns to about 120 microns and a height of about 20 microns to about 160 microns, and spacing between adjacent micro-peaks is about 20 microns to about 120 microns.

15. The self-driven water collecting surface of claim 1, wherein each of the micro-pits has a diameter of about 20 microns to about 120 microns and a depth of about 10 microns to about 50 microns, and spacing between adjacent micro-pits is about 20 microns to about 120 microns.

16. The self-driven water collecting surface of claim 1, wherein the nanostructures are nanoparticles or nanovilli.

17. The self-driven water collecting surface of claim 16, wherein a size of each of the nanoparticles and the nanovilli is smaller than 800 nanometers.

18. The self-driven water collecting surface of claim 1, wherein the superhydrophobic substance is selected from the group consisting of lauric acid, 1H, 1H, 2H, 2H-perfluorodecyl trimethoxysilane, and a combination thereof.

19. A self-driven water collecting surface having a superhydrophilic-superhydrophobic structure, wherein the water collecting surface comprises a superhydrophilic region and a superhydrophobic region, and the superhydrophobic region is a superhydrophobic surface, the superhydrophilic region is a venation channel network structure comprising superhydrophilic channels of different orders connected to each other;
   the superhydrophilic channels are primary channels and secondary channels, the secondary channels are configured for collecting water from the superhydrophobic surface and transporting the water to the primary channels, the primary channels are configured for directional transporting the water to a designated location;
   a total number of the orders is five, the superhydrophilic channels of different orders are a first-order channel, second-order channels, third-order channels, fourth-order channels, and fifth-order channels; the first-order channel and the second-order channels are the primary channels; the third-order channels, the fourth-order channels, and the fifth-order channels are the secondary channels.

* * * * *